T. E. MURRAY, Jr., AND J. B. MURRAY.
APPARATUS FOR ELECTRICAL WELDING.
APPLICATION FILED MAY 31, 1919.
1,320,897.
Patented Nov. 4, 1919.
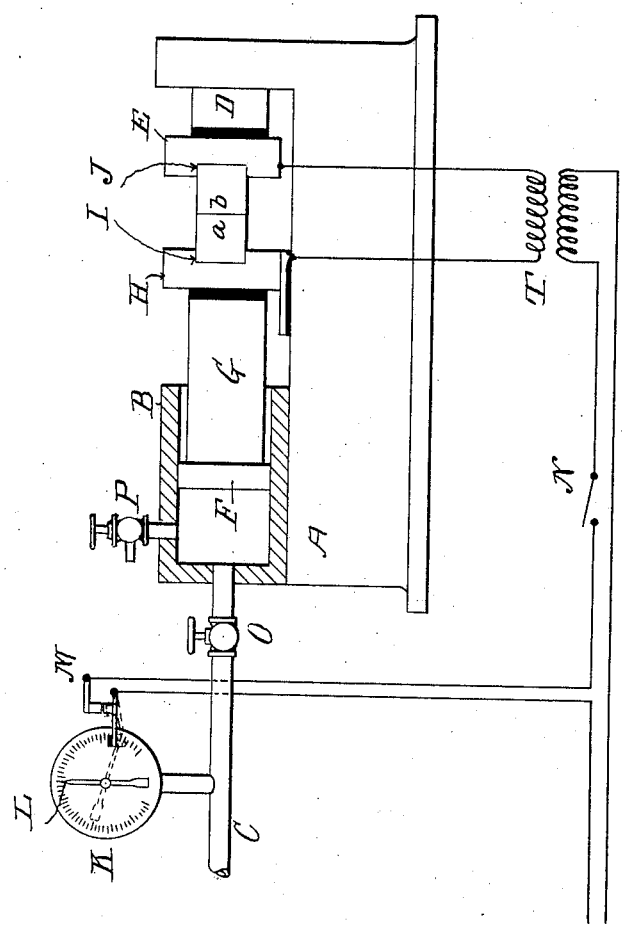
Inventors
Thomas E. Murray Jr.
Joseph B. Murray
By their Attorney
Park Benjamin

UNITED STATES PATENT OFFICE.

THOMAS E. MURRAY, JR., AND JOSEPH B. MURRAY, OF BROOKLYN, NEW YORK.

APPARATUS FOR ELECTRICAL WELDING.

1,320,897.      Specification of Letters Patent.      Patented Nov. 4, 1919.

Application filed May 31, 1919. Serial No. 301,043.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Apparatus for Electrical Welding, of which the following is a specification.

The invention is an apparatus for electrical welding, whereby the bodies to be united are first subjected to both the heating effect of the current and to pressure at the joint, and whereby upon a predetermined degree of said pressure being attained, the current is automatically cut off, so that subsequently the heated metal is subjected to pressure only until a predetermined take-up of the metal at the joint is attained and the weld completed.

The accompanying drawing shows our welding apparatus in vertical section.

A is the bed which carries the cylinder B, into which air under pressure is admitted from any suitable source through pipe C. D is a fixed abutment on bed A, which supports the electrode E, insulated therefrom. F is a piston in cylinder B, the rod G of which carries the electrode H which is insulated from said rod. The electrodes E and H have recesses in their opposing faces, in which recesses are seated the bodies I, J to be welded. The electrodes are connected to any suitable source of welding current through the transformer T.

Communicating with pipe C is a pressure gage K, the rotary index needle L of which may be set to make contact with the spring arm of a switch M and to move said arm downwardly to open said switch. Said spring arm is to be set opposite the mark on the gage scale corresponding to a predetermined pressure in pipe C, and hence in cylinder B, at which it is desired the welding circuit, which includes switch M, shall be opened and the current to the electrodes cut off. Said circuit is also manually controlled by the switch N, and the air pressure in cylinder B is manually controlled by valve O. On said cylinder is an air escape valve P. The bodies I, J are made with integral take-ups $a$, $b$ which extend into the space between the electrodes, and which, before the welding operation begins, are brought into registering contact.

We have found by actual experiment under practical conditions that during the welding operation the amount of current expended does not remain at a constant ratio to the pressure exerted upon the heated bodies, but, on the contrary, said ratio increases rapidly toward the end of said operation. But at that time the metal is already highly heated and the current is not necessary to keep said metal sufficiently plastic to enable the pressing electrode alone to complete the work. Hence we find a material saving in the cost of the current to be effected when said current is cut off before the pressure on the joint is ended and when said increasing pressure attains a certain predetermined limit.

Our above described apparatus is organized to interrupt the welding current automatically when this predetermined increased pressure has been reached, the operation being as follows:

Switch N is closed to establish the welding current and valve O is opened to admit compressed air into cylinder B—valve P being shut. Piston F, moving forward, forces electrode H toward electrode E, so compressing the take-ups $a$, $b$ as they are heated and rendered plastic by the current. The spring arm of switch M is set at whatever degree of air pressure, marked on the scale of gage K, it is desired the current shall be cut off. When the needle L of the gage K reaches said switch arm, it depresses said arm and so opens the welding circuit. The pressure, however, continues until the operator closes the valve O. Valve P is then opened to allow escape of air from cylinder B. Switch N is opened and electrode H is pushed back to allow of the removal of the welded bodies from the apparatus.

It is to be noted that valve O in pipe C is placed between cylinder B and gage K. The closing of valve O, therefore, to cut off the air pressure when the welding operation is ended does not affect the gage which continues to keep the welding circuit open, even if the closing of switch N should be overlooked.

We claim:

1. An electric welding apparatus, comprising welding electrodes, means for moving one of said electrodes to press together the bodies to be welded and to continue said pressure until the weld is completed, and automatically operating means for cutting off the welding current when a predetermined degree of pressure upon said bodies has been reached.

2. An electric welding apparatus, comprising welding electrodes, a device actuated by fluid pressure for forcing together said electrodes, and means operated by a predetermined increase of said pressure in said device for cutting off the welding current.

3. An electric welding apparatus, as in claim 2, further including means for cutting off the fluid pressure from said device without reducing the fluid pressure in said device.

4. An electric welding apparatus, comprising a fixed electrode, a movable electrode, a cylinder, a piston therein connected to said movable electrode, a pipe for conveying fluid under pressure to said cylinder, a pressure gage on said pipe, a moving member actuated by the pressure on said gage, and a switch in circuit with said electrodes controlled by said moving member, whereby upon the attainment of a predetermined fluid pressure in said cylinder, said gage member shall move to open said switch and thereby cut off the welding current.

5. An electric welding apparatus, as in claim 4, further including a valve in said pipe interposed between said gage and said cylinder.

In testimony whereof we have affixed our signatures in presence of two witnesses.

THOMAS E. MURRAY, Jr.
JOSEPH B. MURRAY.

Witnesses:
GERTRUDE T. PORTER,
MAY T. MCGARRY.